(12) United States Patent
Takahashi et al.

(10) Patent No.: US 7,273,902 B2
(45) Date of Patent: *Sep. 25, 2007

(54) STABILIZER AGAINST HYDROLYSIS FOR AN ESTER-GROUP-CONTAINING RESIN AND A THERMOPLASTIC RESIN COMPOSITION

(75) Inventors: Ikuo Takahashi, Chiba (JP); Hirotaka Iida, Chiba (JP); Ken-ichi Yanagisawa, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 440 days.

This patent is subject to a terminal disclaimer.

(21) Appl. No.: 10/929,774

(22) Filed: Aug. 31, 2004

(65) Prior Publication Data

US 2005/0054755 A1    Mar. 10, 2005

(30) Foreign Application Priority Data

Sep. 5, 2003    (JP) ............................. 2003-313602

(51) Int. Cl.
 C08K 5/29    (2006.01)
(52) U.S. Cl. ..................................... 524/195; 524/147
(58) Field of Classification Search ................ 524/147, 524/195, 340–353
See application file for complete search history.

(56) References Cited

U.S. PATENT DOCUMENTS

| | | | |
|---|---|---|---|
| 2,941,956 A | 6/1960 | Bergstrom | |
| 3,849,515 A | 11/1974 | Muller | |
| 3,909,333 A | 9/1975 | Eastman | |
| 5,248,713 A * | 9/1993 | Lunk et al. ................. | 524/120 |
| 6,451,890 B1 * | 9/2002 | Imashiro et al. ............ | 524/195 |
| 6,846,860 B2 * | 1/2005 | Takahashi et al. .......... | 524/128 |
| 6,855,758 B2 * | 2/2005 | Murschall et al. .......... | 524/195 |
| 7,129,190 B2 * | 10/2006 | Takahashi et al. .......... | 442/181 |
| 2003/0068511 A1 * | 4/2003 | Murschall et al. .......... | 428/480 |

FOREIGN PATENT DOCUMENTS

| | | |
|---|---|---|
| BG | 1 056 202 A | 1/1967 |
| DE | 2 210 839 | 9/1973 |
| EP | 0 121 083 A | 10/1984 |
| EP | 0 321 126 A | 6/1989 |
| EP | 0 780 440 A | 6/1997 |
| EP | 1 193 050 A | 4/2002 |
| JP | 47-33279 | 8/1972 |
| JP | 9-296097 | 11/1997 |
| JP | 11-80522 | 3/1999 |
| JP | 3122485 | 10/2000 |
| JP | 2002-187965 | 7/2002 |
| WO | WO99/29768 | 6/1999 |

OTHER PUBLICATIONS

Database WPI, XP-002309266, Section Ch, Week 199729, Derwent Publications Ltd., London, GBX; AN 1997-316725, May 13, 1997.
Database WPI, XP-002309267, Section Ch, Week 200103, Derwent Publications Ltd., London, GB; AN 2001-019451, Oct. 10, 2000.
T. W. Campbell et al.; High Polymers Containing the Carbodiimide Repeat Unit, J. Am. Chem. Soc., vol. 84, pp. 2069-2075, Aug. 1963. Cited in the specification.
Chemical Reviews, vol. 81, No. 4, pp. 619-621, 1981. Cited in the specification.

* cited by examiner

*Primary Examiner*—Peter Szekely
(74) *Attorney, Agent, or Firm*—Westerman, Hattori, Daniels & Adrian, LLP.

(57) ABSTRACT

A stabilizer against hydrolysis, which can solve conventional problems of a carbodiimide compound compounded in an ester-group-containing resin or a biodegradable plastic as a stabilizer against hydrolysis, such as poor heat resistance and a coloring problem due to yellowing, and can provide enhanced resistance against hydrolysis, and a thermoplastic resin composition of an ester-group-containing resin or a biodegradable plastic containing the same. Specifically, that the stabilizer against hydrolysis includes a carbodiimide composition comprising an aliphatic carbodiimide compound (A) and a phosphorus antioxidant (B), preferably the stabilizer contains a carbodiimide composition wherein a phosphorus antioxidant ($B^1$) is dispersed and present in the carbodiimide composition by admixing the phosphorus antioxidant ($B^1$) during synthesis of the aliphatic carbodiimide compound (A), and a thermoplastic resin composition having a superior stability against hydrolysis, characterized in that said stabilizer against hydrolysis is compounded in an easily hydrolysable resin (C).

19 Claims, No Drawings

STABILIZER AGAINST HYDROLYSIS FOR AN ESTER-GROUP-CONTAINING RESIN AND A THERMOPLASTIC RESIN COMPOSITION

BACKGROUND OF THE INVENTION

1. Field of the Invention

The present invention relates to a stabilizer against hydrolysis for an ester-group-containing resin and a thermoplastic composition containing the same. More specifically, the present invention relates to a stabilizer against hydrolysis comprising a carbodiimide composition containing an aliphatic carbodiimide compound and a phosphorus antioxidant, preferably a stabilizer against hydrolysis comprising a carbodiimide composition wherein a phosphorus antioxidant is dispersed and compounded therein by admixing the phosphorus antioxidant in a raw material of an aliphatic carbodiimide compound in advance, and a thermoplastic resin composition containing the same.

2. Description of the Prior Art

A carbodiimide compound has been widely used as a stabilizer against hydrolysis for an ester-group-containing resin or a biodegradable plastic (see, JP-A-11-80522 and A-2002-187965).

However, a compound with low molecular weight such as a monocarbodiimide had problems such as causing environmental pollution by generating a component having an offensive odor or losing the addition effect thereof by vaporization, because of based on a tendency for easy thermal decomposition during processing.

Polycarbodiimide has been used to solve these problems, but use of this compound is difficult for an application where hue is seriously considered (for example, application to clothing fiber) due to the yellowing problem during processing.

The above-described-ester-group-containing resin includes, for example, a polyethylene terephthalate resin, a polybutylene terephthalate resin, a polyester polyurethane resin, an unsaturated polyester resin, a maleic resin, an alkyd resin, a polycarbonate resin, a polyester carbonate resin, an aliphatic polyester resin, polyether esters, polyesteramides and polycaprolactones.

Further, biodegradable plastics can roughly be classified to aliphatic polyesters having polyester groups in their molecular chains (including those produced by microorganisms), natural polymers such as cellulose, polysaccharides produced by microorganisms, polyvinyl alcohol (PVA) and polyethers such as polyethylene glycol (PEG).

Among them, polylactic acid of an aliphatic polyester as a plastic material derived from plants, and with there being increasing interest on global environment problems such as $CO_2$ reduction has been extensively studied in commercial fields such as automotive parts, housings of home electric appliances and clothing.

However, the above-described resin having ester groups (ester-group-containing resins) and a biodegradable plastic have poor stability against hydrolysis. In particular, a biodegradable plastic including an aliphatic polyester has significantly poor stability, which has made it difficult to use these materials in applications with the same levels of functions (such as strength, water resistance, moldability and heat resistance) as those required of conventional plastics.

From these circumstances, several proposals relating to improvement of stability against hydrolysis of an ester-group-containing resin or a biodegradable plastic have been made. For example, proposals disclosed include one directed to a method for controlling a biodegradation rate of a biodegradable plastic (see, for example, JP-A-11-80522 and JP-A-2001-525473), or another one directed to a method for stabilizing against hydrolysis of an ester-group-containing resin (see, for example, JP-A-9-296097 and JP No. 3,122, 485).

In spite of these proposals, the above problems of a carbodiimide compound have not sufficiently been solved in applications where hue is seriously considered, such as fibers, films and sheets, because of the high yellowing of a carbodiimide compound when utilized as a stabilizer against hydrolysis, added to an ester-group-containing resin or a biodegradable plastic.

SUMMARY OF THE INVENTION

Therefore, the object of the present invention is to provide a stabilizer against hydrolysis, which can solve conventional problems of a carbodiimide compound to be compounded in an ester-group-containing resin or a biodegradable plastic as a stabilizer against hydrolysis, such as poor heat resistance and a coloring problem due to yellowing, and can provide enhanced resistance against hydrolysis, and a thermoplastic resin composition of an ester-group-containing resin or a biodegradable plastic containing the same.

The present inventors have found, after comprehensive study to solve the problems of the prior art described above, that a carbodiimide composition, having Yellow Index (YI) of not higher than 20, which is a mixed dispersion of a carbodiimide compound and a phosphorus antioxidant can be obtained by mixing an aliphatic carbodiimide compound and a phosphorus antioxidant, preferably by admixing a phosphorus antioxidant during synthesis of an aliphatic carbodiimide compound, and that a thermoplastic resin composition, that is, an ester-group-containing (ester-linkage-containing) resin or a biodegradable plastic composition, added with the carbodiimide composition or the carbodiimide composition further admixed with a phosphorus antioxidant as a stabilizer against hydrolysis, has extremely superior hue stability, that is, suppressed yellowing, and improved stability against hydrolysis. The present invention has been completed based on these findings.

Namely, the first aspect of the present invention is to provide a stabilizer against hydrolysis characterized in a stabilizer comprising a carbodiimide composition comprising an aliphatic carbodiimide compound (A) and a phosphorus antioxidant (B).

Further, the second aspect of the present invention is to provide the stabilizer against hydrolysis according to the first aspect, wherein a phosphorus antioxidant ($B^1$) is dispersed and present in the carbodiimide composition by admixing the phosphorus antioxidant ($B^1$) during synthesis of the aliphatic carbodiimide compound (A).

Further, the third aspect of the present invention is to provide the stabilizer against hydrolysis according to the second aspect, wherein the phosphorus antioxidant ($B^1$) is admixed in a raw material of the aliphatic carbodiimide compound (A) in advance.

Further, the forth aspect of the present invention is to provide the stabilizer against hydrolysis according to the second aspect, wherein 0.01 to 20 parts by weight of the phosphorus antioxidant ($B=B^1$) is compounded to 100 parts by weight of the aliphatic carbodiimide compound (A).

Further, the fifth aspect of the present invention is to provide the stabilizer against hydrolysis according to the second aspect, wherein a phosphorus antioxidant ($B^2$) is further compounded in the carbodiimide composition in the total amount of 0.01 to 20 parts by weight of the phosphorus antioxidants ($B=B^1+B^2$) to 100 parts by weight of the aliphatic carbodiimide compound (A).

Further, the sixth aspect of the present invention is to provide the stabilizer against hydrolysis according to the first aspect, wherein the carbodiimide composition has the Yellow Index (YI) of not higher than 20.

Further, the seventh aspect of the present invention is to provide the stabilizer against hydrolysis according to the first aspect, wherein the aliphatic carbodiimide compound (A) is an aliphatic polycarbodiimide compound having degree of polymerization of not lower than 5.

Further, the eighth aspect of the present invention is to provide the stabilizer against hydrolysis according to the first or the second aspect, wherein the carbodiimide composition further contains a hindered phenol type antioxidant in addition to the phosphorus antioxidant (B).

Further, the ninth aspect of the present invention is to provide the stabilizer against hydrolysis according to the first aspect, wherein the phosphorus antioxidant (B) has pentaerythritol structure.

On the other hand, the tenth aspect of the present invention is to provide a thermoplastic resin composition having a superior stability against hydrolysis, wherein the stabilizer against hydrolysis according to any one of the first to the ninth aspects is compounded in at least one kind of an easily hydrolysable resin (C) selected from a group consisting of an ester-group-containing resin and a biodegradable plastic.

Further, the eleventh aspect of the present invention is to provide the thermoplastic resin composition according to the tenth aspect, wherein the stabilizer against hydrolysis is compounded in an amount of 0.01 to 5 parts by weight to 100 parts by weight of the easily hydrolysable resin (C).

Further, the twelfth aspect of the present invention is to provide the thermoplastic resin composition according to the tenth aspect, wherein the easily hydrolysable resin (C) is an aliphatic polyester.

Further, the thirteenth aspect of the present invention is to provide plastic molded parts using the thermoplastic resin composition according to any one of the tenth to the twelfth aspects.

Further, the fourteenth aspect of the present invention is to provide plastic molded parts according to the thirteenth aspect, wherein forms of the molded parts are molded articles, extruded articles, blow molded articles, fibers, non-woven fabrics, films or sheet-like articles.

As described hereinabove, the present invention relates to a stabilizer against hydrolysis and the like comprising a carbodiimide composition comprising an aliphatic carbodiimide compound (A) and a phosphorus antioxidant (B), and involves the following as preferable embodiments thereof.

(1) The stabilizer against hydrolysis according to the first aspect, wherein a compounding ratio of the aliphatic carbodiimide compound (A) and the phosphorus antioxidant (B) in the carbodiimide composition is 0.01 to 20 parts by weight of the latter to 100 parts by weight of the former.

(2) The stabilizer against hydrolysis according to the eighth aspect, wherein the hindered phenol type antioxidant is pentaerythritol-tetrakis[3-(3,5-di-t-butyl-4-hydroxyphenyl)propionate].

(3) The stabilizer against hydrolysis according to the ninth aspect, wherein the phosphorus antioxidant (B) has an aromatic hydrocarbon group further having a t-butyl group in addition to pentaerythritol structure.

(4) The stabilizer against hydrolysis according to any one of the ninth aspect or the above-described (3), wherein the phosphorus antioxidant (B) is bis-(2,4-di-t-butylphenyl) pentaerythritol-diphosphite or bis-(2,6-di-t-butyl-4-methylphenyl)pentaerythritol-diphosphite.

Conventionally, a carbodiimide compound had been added as a stabilizer against hydrolysis to improve stability against hydrolysis of an ester-group-containing resin or the like, but it often became difficult to use the compound due to the occurrence of coloring by heat, thermal oxidation, sunlight, etc. during processing thereof, in an application where hue is seriously considered. The stabilizer of the present invention has effect to provide a thermoplastic resin composition having extremely superior hue stability and high stability against hydrolysis, when the stabilizer is used in at least one kind of an easily hydrolysable resin selected from a group consisting of an ester-group-containing resin and a biodegradable plastic.

DETAILED DESCRIPTION OF THE INVENTION

Hereinbelow, the stabilizer against hydrolysis of the present invention will be described in detail item by item.

A stabilizer against hydrolysis of the present invention preferably contains a carbodiimide compound comprising an aliphatic carbodiimide compound (A) and a phosphorus antioxidant (B), and further a phosphorus antioxidant ($B^1$) is preferably dispersed and present in the composition by admixing during synthesis of the aliphatic carbodiimide compound (A).

1. A Carbodiimide Compound 1.1 An Aliphatic Carbodiimide Compound

As a carbodiimide compound having at least one carbodiimide group in a molecule (including a polycarbodiimide compound) used in the present invention, those synthesized by a commonly known method may be used. For example, a carbodiimide compound may be synthesized by subjecting various kinds of polyisocyanates to a decarboxylation condensation reaction with an organophosphorus compound or an organometal compound as a catalyst, at a temperature of not lower than about 70° C., in an inert solvent or without using any solvent.

As a polycarbodiimide compound included in the above-described carbodiimide compounds, those produced by various methods can be used. Basically, polycarbodiimide compounds can be used, which are manufactured by conventional methods for manufacturing polycarbodiimide [for example, U.S. Pat. No. 2,941,956, JP-B-47-33279, J. Org. Chem., 28, 2,069-2,075 (1963) and Chemical Review 1981, Vol. 81, No. 4, p 619-621].

Organic diisocyanate utilizable as a raw material for manufacturing an aliphatic polycarbodiimide compound of the present invention includes, for example, an aliphatic diisocyanate, an alicyclic diisocyanate and a mixture thereof. More specifically, the organic diisocyanate includes such as hexamethylene diisocyanate, cyclohexane-1,4-diisocyanate, isophorone diisocyanate, dicyclohexylmethane-4, 4'-diisocyanate and methylcyclohexane diisocyanate.

In addition, in the case of the above-described aliphatic polycarbodiimide compound, the degree of polymerization can be adequately controlled by quenching a polymerization reaction in the midst of the reaction by cooling or the like. In this case, the terminal group becomes isocyanate. Another method for adequately controlling the degree of polymerization is to cap all or a part of the remaining terminal isocyanate groups using a reactive compound with terminal isocyanate groups of an aliphatic polycarbodiimide compound such as a monoisocyanate. Control of the degree of polymerization is preferable from the viewpoint of quality improvement, due to providing improved compatibility to a polymer or enhanced storage stability.

A monoisocyanate utilizable to control the degree of polymerization by capping terminal groups of an aliphatic polycarbodiimide compound includes, for example, phenyl isocyanate, tolylisocyanate, dimethylphenyl isocyanate, cyclohexyl isocyanate and butyl isocyanate.

Further, an end-capping agent to control the degree of polymerization by capping terminal groups of an aliphatic polycarbodiimide compound is not limited to the above-described monoisocyanate, but also includes active hydrogen compounds reactive with isocyanate, such as (i) aliphatic, aromatic or alicyclic compounds having an —OH group, such as methanol, ethanol, phenol, cyclohexanol, N-methylethanolamine, polyethylene glycol monomethyl ether and polypropylene glycol monomethyl ether; (ii) diethylamine and dicyclohexylamine having an =NH group; (iii) butylamine and cyclohexylamine having an —NH$_2$ group; (iv) succinic acid, benzoic acid and cyclohexanoic acid having a —COOH group; (v) ethylmercaptane, allylmercaptane and thiophenol having a —SH group; (vi) compounds having an epoxy group; (vii) acetic anhydride, methyltetrahydrophthalic anhydride and methylhexahydrophthalic anhydride. Among these compounds, those having an —OH group are desirable as less yellowing occurs when these structures are utilized.

The above-described decarboxylation condensation reaction of an organic diisocyanate is carried out under the presence of a suitable carbodiimidation catalyst, and preferable carbodiimidation catalysts to be used are organophosphorus compounds, organometal compounds (compounds represented by the general formula of M-(OR)$_4$ [wherein M represents titanium (Ti), sodium (Na), potassium (K), vanadium (V), tungsten (W), hafnium (Hf), zirconium (Zr), lead (Pb), manganese (Mn), nickel (Ni), calcium (Ca), barium (Ba) and the like; and R represents an alkyl group or an aryl group having 1 to 20 carbon atoms]). Among them, in particular, phosphorene oxides in the organophosphorus compounds and alkoxides of titanium, hafnium and zirconium in the organometal compounds are preferable from the viewpoint of activity.

The above-described phosphorene oxides include specifically, 3-methyl-1-phenyl-2-phosphorene-1-oxide, 3-methyl-1-ethyl-2-phosphorene-1-oxide, 1,3-dimethyl-2-phosphorene-1-oxide, 1-phenyl-2-phosphorene-1-oxide, 1-ethyl-2-phosphorene-1-oxide, 1-methyl-2-phosphorene-1-oxide and double bond isomers thereof. Among them, 3-methyl-1-phenyl-2-phosphorene-1-oxide is particularly preferable because of easiness in industrial availability.

According to the present invention, when a stabilizer against hydrolysis is compounded in a resin having an ester group (an ester bond) or a biodegradable plastic, the carbodiimide compound plays a role to control hydrolysis, in the initial stage after the addition, by reacting with a hydroxyl group and a carboxyl group remaining in a resin having an ester group which is thought to facilitate the hydrolysis, or a biodegradable plastic resin. After that, the carbodiimide composition plays a role by bonding to the ester linkages cleaved by the hydrolysis reaction or bonds the biodegradable plastic to recombine them.

A carbodiimide compound for this purpose preferably includes an aliphatic carbodiimide compound having not less than one carbodiimide group in a molecule such as 4,4'-dicyclohexylmethanecarbodiimide (degree of polymerization=2 to 20). The degree of polymerization of an aliphatic carbodiimide compound is preferably not lower than 5, in view of heat resistance. Further, an aliphatic carbodiimide compound has preferably, in particular, isocyanate terminal groups from the viewpoint of stability against hydrolysis.

1.2 An Antioxidant

An antioxidant used in combination in synthesis of an aliphatic polycarbodiimide compound of the present invention is preferably a phosphorus antioxidant it self or said phosphorus antioxidant and a hindered phenol antioxidant in combined use.

The feature of the present invention is that a phosphorus antioxidant is added to an aliphatic polycarbodiimide compound during synthesis thereof, or an antioxidant is admixed into raw materials of an aliphatic polycarbodiimide compound in advance. By this procedure, a carbodiimide compound and an antioxidant can be homogeneously dispersed and present.

Further, in the present invention, in addition to a method for admixing an antioxidant during synthesis of a carbodiimide compound, a carbodiimide composition may also be used as a stabilizer against hydrolysis by sufficiently mixing or kneading a carbodiimide compound after synthesis with particularly a phosphorus antioxidant.

A phosphorus antioxidant includes such as tris(2,4-di-t-butylphenyl) phosphite (Trade Name: Irgaphos 168 from Ciba Specialty Chemicals Ltd., Trade Name: Adekastab 2112 from Asahi Denka Kogyo K. K., etc.), bis(2,4-di-t-butylphenyl)pentaerythritol diphosphite (Trade Name: Irgaphos 126 from Ciba Specialty Chemicals Ltd., Trade Name: Adekastab PEP-24G from Asahi Denka Kogyo K. K., etc.), bis(2,6-di-t-butyl-4-methylphenyl)pentaerythritol diphosphite (Trade Name: Adekastab PEP-36 from Asahi Denka Kogyo K. K.) and distearyl pentaerythritol diphosphite (Trade Name: Adekastab PEP-8 from Asahi Denka Kogyo K. K., Trade Name: JPP-2000 from Johoku Chemical Co., Ltd., and the like). A phosphorus antioxidant has preferably pentaerythritol structure from the viewpoint of improvement in stability against hydrolysis, and particularly preferably an aromatic hydrocarbon group having a t-butyl group in addition to pentaerythritol structure.

As a particularly preferable example of a phosphorus antioxidant, chemical formula of bis(2,6-di-t-butyl-4-methylphenyl)pentaerythritol diphosphite (Trade Name: Adekastab PEP-36 from Asahi Denka Kogyo K. K.) is shown below.

chemical formula

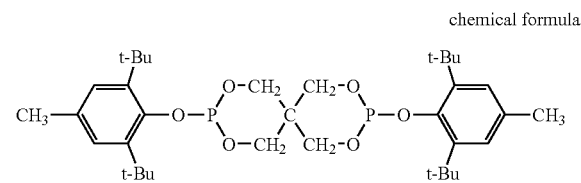

Further, a hindered phenol type antioxidant preferably used in combination with the above-described phosphorus antioxidant has a molecular weight of preferably not lower than 400 from the viewpoint of heat resistance requiring a 5% weight loss temperature not lower than 250° C. as determined by a TG method. On the other hand, lower molecular weight may cause a phenomena such as scattering, volatilization or extraction by a substance in contact therewith. In particular, since migration of an antioxidant into foods from plastic material in contact with foods may cause a sanitary problem, a molecular weight of preferably not lower than 400, more preferably not lower than 500 is used in the present invention. In addition, by selecting a hindered phenol type antioxidant having higher molecular weight, an effect of improving heat resistance of a plastic composition can be provided.

Such a hindered phenol type antioxidant having molecular weight of not lower than 400 includes, for example, 4,4'-methylene-bis-(2,6-di-t-butylphenol) (MW=420), octadecyl-3-(3,5-di-t-butyl-4-hydroxyphenyl)propionate (MW=531) (Trade Name: Irganox 1076 from Ciba Specialty Chemicals Ltd.), pentaerythritoltetrakis[3-(3,5-di-t-butyl-4-hydroxyphenyl)propionate] (MW=1,178) (Trade Name: Irganox 1010 from Ciba Specialty Chemicals Ltd.), 3,9-bis{2-[3-(3-tert-butyl-4-hydroxy-5-methylphenyl)propionyloxy]-1,1-dimethylethyl}-2,4,8,10-tetraoxaspiro[5.5]undecane (MW=741) (Trade Name: Sumilizer GA-80 from Sumitomo Chemical Co., Ltd.).

As described above, an antioxidant used in the present invention is preferably added during synthesis of a carbodiimide compound. By this procedure, coloring of a carbodiimide compound in synthesis thereof can be suppressed, and coloring of a carbodiimide compound, when added to an ester-group-containing resin or a biodegradable plastic, can also be suppressed. An antioxidant can be used in the amount effective to provide improvements in stability against hydrolysis and heat resistance.

Thus, the total amount of an antioxidant to be compounded is preferably 0.01 to 20 parts by weight, and particularly preferably 0.1 to 10 parts by weight to 100 parts by weight of a carbodiimide compound. An amount of an antioxidant to be compounded less than 0.01 part by weight gives poor effect in preventing coloring in carbodiimide synthesis or coloring during the addition to an ester-group-containing resin or a biodegradable plastic. On the other hand, an amount over 20 parts by weight causes problems such as lowering the reaction rate in a carbodiimide synthesis or making an antioxidant hardly compatible to the carbodiimide compound.

In the case when a hindered phenol type antioxidant and a phosphorus antioxidant are used in combination as antioxidants, a ratio by weight of a hindered phenol antioxidant to a phosphorus antioxidant is preferably in the range of 5:1 to 1:5.

In addition, an antioxidant to be compounded into plastics may also include antioxidants other than the above-described hindered phenol type antioxidants and phosphite type of antioxidants (phosphorus antioxidants), for example, aromatic amines such as diphenyl amine and phenyl-α-naphthyl amines and sulfur-containing antioxidants. These antioxidants may be used within the amount not to impair the effect of the present invention. For example, a small amount of an aromatic amine type antioxidant can be used in combination, in addition to the above-described hindered phenol or phosphite type antioxidants. However, these aromatic amine type antioxidants or the like must be compounded carefully because it may easily cause unwanted coloring.

1.3 A Carbodiimide Composition

As described above, a carbodiimide composition of the present invention comprises an aliphatic polycarbodiimide compound and a phosphorus antioxidant, and preferably has a TG 5% weight loss temperature not lower than 250° C. as determined by a thermogravimetric (TG) method (a thermobalance analysis method) from the viewpoint of heat resistance, and a Yellow Index (YI) of not higher than 10. Yellow Index in the present invention, is measured and evaluated in accordance with JIS K7103, "A test method for yellow index and degree of yellowing of plastics".

In the present invention, an antioxidant may preferably be admixed into a carbodiimide compound, as described above, during a raw material charging step in synthesis of an aliphatic polycarbodiimide compound, or may be admixed during a reaction step in said synthesis, but it may be admixtured to an aliphatic carbodiimide compound after synthesis.

A carbodiimide composition of the present invention can suitably be used as a stabilizer against hydrolysis of a resin having an ester bond (an ester group) or a biodegradable plastic.

In addition, for example, an aliphatic polycarbodiimide composition admixed with a phosphorus antioxidant during synthesis of an aliphatic polycarbodiimide compound, may be suitably compounded further with a phosphorus antioxidant or further still with a phenol antioxidant, if necessary.

In this case, total amount of said antioxidants including a phosphorus antioxidant further added is, as described above, preferably 0.01 to 20 parts by weight, particularly preferably 0.1 to 10 parts by weight to 100 parts by weight of an aliphatic polycarbodiimide compound in a carbodiimide composition.

In the present invention, such a carbodiimide composition also includes as one obtained by further compounding a phosphorus antioxidant or the like to an aliphatic polycarbodiimide compound already admixed with a phosphorus antioxidant during synthesis thereof.

When a stabilizer against hydrolysis of the present invention is used for a resin having an ester linkage (an ester-group-containing resin) or a biodegradable plastic, said stabilizer against hydrolysis is preferably compounded in an amount of 0.01 to 5 parts by weight to 100 parts by weight of at least one kind of an easily hydrolysable resin (C) selected from a group consisting of an ester-group-containing resin and a biodegradable plastic.

Further, if the amount of an aliphatic polycarbodiimide compound in a carbodiimide composition is mentioned, the amount of the aliphatic polycarbodiimide compound to be compounded is preferably 0.01 to 5 parts by weight, and particularly preferably 0.1 to 3.0 parts by weight to 100 parts by weight of at least one kind of an easily hydrolysable resin selected from a group consisting of an ester-group-containing resin and a biodegradable plastic. The amount less than 0.01 part by weight can not bring about the improvement effect as to stability against hydrolysis of an ester-group-containing resin or a biodegradable plastic composition, while, the amount over 5 parts by weight may enhance unwanted coloring. In the case when coloring is insignificant, an amount greater than 5 parts by weight may be utilized.

A phosphorus antioxidant that may be suitably compounded in a carbodiimide composition, if necessary, includes, for example, tris-(2,4-di-t-butylphenyl) phosphite (Trade Name: Irgaphos 168 from Ciba Specialty Chemicals Ltd., Trade Name: Adekastab 2112 from Asahi Denka Kogyo K. K., etc.), bis-(2,4-di-t-butylphenyl)pentaerythritol-diphosphite (Trade Name: Irgaphos 126 from Ciba Specialty Chemicals Ltd., Trade Name: Adekastab PEP-24G from Asahi Denka Kogyo K. K., etc.), bis-(2,6-di-t-butyl-4-methylphenyl)pentaerythritol-diphosphite (Trade Name: Adekastab PEP-36 from Asahi Denka Kogyo K. K.), distearyl-pentaerythritol-diphosphite (Trade Name: Adekastab PEP-8 from Asahi Denka Kogyo K. K., Trade Name: JPP-2000 from Johoku Chemical Co., Ltd., etc.), similarly to the phosphorus antioxidant described above. A phosphorus antioxidant preferably has a pentaerythritol structure from the viewpoint of improvement in stability against hydrolysis, and particularly preferably an aromatic hydrocarbon group having a t-butyl group in addition to the pentaerythritol structure.

2. An Easily Hydrolysable Resin

An easily hydrolysable resin (C) of the present invention is at least one kind of a resin selected from a group consisting of an ester-group-containing resin and a biodegradable plastic.

2.1 An Estergroup-containing Resin

In the present invention, an ester as a main component or an essential component of a plastic (resin) (that is, preferably a polyhydroxypolyester) involves a reaction product between a polyvalent (preferably a bivalent or a trivalent) alcohol and a polybasic (preferably dibasic) carboxylic acid. In manufacturing of polyesters, instead of using a free polycarboxylic acid, a corresponding polycarboxylic anhydride, a corresponding polycarboxylic acid ester of a lower alcohol or a mixture thereof can also be used. As a polycarboxylic acid, aliphatic, alicyclic, aromatic-aliphatic, aromatic and/or heterocyclic types are included. Substituted acids (for example, with a halogen atom) and/or unsaturated acids can be used, if necessary. Examples of suitable carboxylic acids and derivatives thereof include such as succinic acid, adipic acid, suberic acid, azelaic acid, sebacic acid, dodecanedioic acid, phthalic acid, isophthalic acid, trimellitic acid, phthalic anhydride, tetrahydrophthalic anhydride, hexahydrophthalic anhydride, tetrarchlorophthalic anhydride, endomethylenetetrahydrophthalic anhydride, glutaric anhydride, maleic acid, maleic anhydride, fumaric acid, dimers and trimers of unsaturated fatty acids (these acids are used by mixing with an unsaturated fatty acid monomer such as oleic acid, if necessary); and dimethyl terephthalate ester and bis-glycol terephthalate ester. Suitable polyvalent alcohols include such as ethylene glycol, 1,2- and 1,3-propylene glycol, 1,4-, 1,3- and 2,3-butylene glycol, 1,6-hexanediol, 1,8-octanediol, neopentyl glycol, 1,4-bis(hydroxylmethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, formitol, methyl glycoside, diethylene glycol, triethylene glycol, tetraethylene glycol, higher polyethylene glycol, dipropylene glycol, higher polypropylene glycol, dibutylene glycol, and higher polybutylene glycol having molecular weight of up to about 10,000. Polyesters may partly have terminal carboxyl groups. Polyesters of lactones such as ε-caprolactone and hydroxycarboxylic acids such as ε-hydroxycaproic acid may also be used.

Suitable "polyester" involves polyesteramide and polyamide if necessary, for example, mainly linear condensates obtained from a mixture of polybasic saturated or unsaturated carboxylic acids or anhydrides thereof, polyvalent saturated or unsaturated aminoalcohols, diamines, polyamines and mixtures thereof, as well as mixtures of these compounds and the above-described polyvalent alcohols. It should be understood that polyester compounds already having a urethane group or a urea group and natural polyesters optionally modified such as castor oil are also involved in "polyester" in the context of the present invention. Polyesterurethanes stabilized by a stabilizer against hydrolysis of the present invention are known. These types of polyesterurethanes can be synthesized from the above-described polyester having average molecular weight of 500 to about 10,000; other polyols and/or polyamines having relatively high molecular weight such as polyether, polycarbonate, polybutadiene diol or polyol (amine) (these compounds have about 1.5 to 5, preferably about 2 to 3 Zerewitinoff active groups in their molecules in average), if necessary; aromatic, aromatic-aliphatic, aliphatic and/or alicyclic polyisocyanates having about 1.5 to 5 (preferably about 2 to 3, more preferably about 2) isocyanate groups in their molecules in average; and further a chain extension agent for single chains, such as diols, polyols, diamines, polyamines and/or aminoalcohols, if necessary.

The above-described polyhydroxyl compounds may be modified by various methods before using, by a polyisocyanate polyaddition method. For example, according to DE-A-2,210,839 (U.S. Pat. No. 3,849,515) and DE-A-2,544,195, polyols having relatively high molecular weight, composed of various segments bonded by ether crosslink, can be formed by condensation of a mixture of various kinds of polyhydroxyl compounds (for example, one or more kinds of polyesterpolyols) by etherification under the presence of a strong acid. Further, DE-A-2,559,372 discloses introduction of an amide group to a polyhydroxyl compound and or DE-A-2,620,487 discloses introduction of a triazine group to a polyhydroxyl compound by reaction with a polyfunctional cyanate ester.

It is particularly advantageous to convert a polyhydroxyl compound, having relatively high molecular weight, completely or partly to corresponding anthranylate ester by reaction with isatoic anhydride as described in DE-A-2,019,432 and DE-A-2,619,840, as well as U.S. Pat. Nos. 3,808,250, 3,975,428 and 4,016,143. A compound having relatively high molecular weight and a terminal aromatic amino group can thus be obtained. According to DE-A-2,546,536 and U.S. Pat. No. 3,865,791, a compound having relatively high molecular weight and a terminal amino group can be obtained by a reaction of an NCO prepolymer and enamine, aldimine or ketimine containing a hydroxyl group, followed by hydrolysis. Other methods for manufacturing an ester compound having relatively high molecular weight and a terminal amino group or hydrazide group is described in, for example, DE-A-1,694,152 (U.S. Pat. No. 3,625,871).

In the present invention, even a polyhydroxyl compound containing a polyaddition compound, polycondensate or polymer having high molecular weight of a finely dispersed type or a dissolved type can be used. Such a polyhydroxyl compound can be obtained by, for example, an in situ polyaddition reaction (such as a reaction between a polyisocyanate and an amino-functional compound) or an in situ polycondensation reaction (such as a reaction between formaldehyde and phenol and/or amine) in the above-described polyester. These kinds of methods are disclosed in, for example, DE-B-1,168,075 and DE-B-1,260,142, as well as DE-A-2,324,134, DE-A-2,423,984, DE-A-2,512,385, DE-A-2,513,815, DE-A-2,550,796, DE-A-2,550,797, DE-A-2,550,833, DE-A-2,550,862, DE-A-2,633,293 and DE-A-2,639,254. Further, a polyhydroxyl compound can also be obtained by mixing an aqueous polymer dispersion prepared in advance with a polyhydroxyl compound, followed by removing water from the mixture, according to U.S. Pat. No. 3,869,413 or DE-A-2,550,860. The effect of carbodiimide containing isocyanate group, used in the present invention is premised on the possibility that a carboxylic acid is formed by thermal degradation or hydrolytic degradation of polyurethane.

Other plastics suitable to be stabilized by the present invention are polyterephthalates, which can be synthesized from, for example, dimethyl terephthalate or other homologous terephthalate esters and butanediol and/or ethanediol. Further, other components such as diols and/or dicarboxylic acids may be incorporated therein. Average molecular weight (Mn) is at least 10,000. Particularly suitable polyterephthalates involve polybutylene terephthalate and polyethylene terephthalate. These substances are used as high quality synthesis materials or fibers. These plastics can also contain a diol with a relatively long chain such as C4 polyether in a relatively high ratio, in elastic form. These materials are available, for example, with a trade name of "Hytrel" (from Du Pont Co.). Other materials suitable to be stabilized by the present invention include a commercially available polyamide with a polyester block, polyetherpolyamide having an ester group, and generally any type of plastic having an ester group, preferably one having an ester group in a main chain thereof.

2.2 A Biodegradable Plastic

A biodegradable plastic used in a thermoplastic resin composition or a biodegradable plastic composition in the present invention, as a main component includes, for example, polyesters metabolized by microorganisms, and among them, preferably aliphatic polyesters which can easily be metabolized by microorganisms.

Generally, in a biodegradable plastic, biodegradation is said to proceed by the following processes.

Namely, in decomposition of a polymer material (a biodegradable plastic) discharged into the environment:
(i) Firstly, a polymer decomposition enzyme adsorbs on the surface of a polymer material. The enzyme is one such as extracellularly secreted by a specific kind of microorganism. (ii) Then, the enzyme cleaves chemical bonds such as ester, glycoside and peptide linkages in polymer chains by hydrolysis reaction. (iii) As a result, polymer material is further decomposed up to a monomer unit level by the decomposition enzyme with decrease in molecular weight. (iv) Finally, decomposed products are further metabolized and consumed to be converted to carbon dioxide, water and cell components, etc. by various microorganisms.

Aliphatic polyesters easily metabolized by microorganism via hydrolysis reaction include:
(1) Polylactic acid (polylactide) type aliphatic polyesters
(2) Condensate type aliphatic polyesters from polyvalent alcohols/polybasic acids
(3) Aliphatic polyesters produced by microorganisms such as polyhydroxybutyrate (PHB) and
(4) Polycaprolactone (PCL) type aliphatic polyesters In the present invention, any kind of the above-described aliphatic polyesters can be preferably used as a biodegradable plastic.

Further, in the present invention, a biodegradable plastic is not limited to the above-described aliphatic polyesters, and other biodegradable plastics can also be used as long as they have chemical bonds such as ester, glycoside and peptide linkages, where polymer chains in a biodegradable plastic are cleaved by hydrolysis reaction. Such plastics include, for example, a carbonate copolymer of an aliphatic polyester in which carbonate structure is randomly introduced in a molecular chain of an aliphatic polyester, and a copolymer of aliphatic polyester and polyamide, having an amide linkage, by introduction of nylon in molecular chain structure of an aliphatic polyester.

Hereinbelow, an aliphatic polyester will be described in more detail.

(1) Polylactic Acid (Polylactide) Type Aliphatic Polyesters

Polylactic acid (polylactide) type aliphatic polyesters include polylactides, more specifically, a polymer of oxyacids such as lactic acid, malic acid and glycolic acid, or a copolymer thereof, for example, polylactic acid, poly($\alpha$-malic acid), polyglycolic acid and a glycolic acid/lactic acid copolymer, and particularly an aliphatic polyester of hydroxycarboxylic acid type represented by polylactic acid.

The above-described polylactic acid type aliphatic polyesters can be obtained generally by a so-called lactide method, which is a ring opening polymerization method for lactide as a cyclic diester or corresponding lactones, or by a direct dehydration condensation method for lactic acid and a polycondensation method between formalin and carbon dioxide, as a method other than a lactide method.

Catalysts for manufacturing the above-described polylactic acid type aliphatic polyester include, for example, compounds of tin, antimony, zinc, titanium, iron and aluminum. Among them, preferable catalysts are tin-based and aluminum-based catalysts, and particularly preferable catalysts are tin octylate and aluminum acetylacetonate.

Among the above-described polylactic acid type aliphatic polyesters, poly-L-lactic acid obtained by a ring opening polymerization of lactide is preferable, because it is hydrolyzed to L-lactic acid the safety of which has been confirmed. However, a polylactic acid type aliphatic polyester used in the present invention is not limited to poly-L-lactic acid, and therefore, lactide used for manufacturing thereof is not limited to L-isomer thereof. Even a composition composed of L-isomer, D-isomer and meso-form in an arbitrary ratio can be used, but a ratio of any one isomer unit must be not lower than 90%, when the composition is required to be crystalline and has a high melting point and enhanced mechanical properties and heat resistance.

(2) Condensate Type Aliphatic Polyesters from Polyvalent Alcohols/Polybasic Acids Condensate type aliphatic polyesters from polyvalent alcohols/polybasic acids include, for example, aliphatic glycol/polybasic acid type polyesters obtained by reaction of aliphatic glycols and aliphatic polybasic acids (or anhydrides thereof) under the presence of a catalyst, or aliphatic glycol/polybasic acid type polyesters having high molecular weight, obtained by reaction of the same using a small amount of a coupling agent, if necessary.

Aliphatic glycols for manufacturing aliphatic glycol/polybasic acid type polyesters used in the present invention include, for example, ethylene glycol, 1,4-butanediol, 1,6-hexanediol, decamethylene glycol, neopentyl glycol and 1,4-cyclohexanedimethanol. Ethylene oxide can also be used. Two or more kinds of these glycols may be used in combination.

Aliphatic polybasic acids and anhydrides thereof to form aliphatic glycol/polybasic acid type polyesters by reaction with the above-described aliphatic glycols include, for example, succinic acid, adipic acid, suberic acid, sebacic acid, dodecanoic acid, succinic anhydride and adipic anhydride. Generally, these compounds can be used as any form available on the market. Two or more kinds of these polybasic acids and anhydrides thereof may be used in combination.

The above-described glycols and polybasic acids are aliphatic ones, but a small amount of other types of components, for example, aromatic glycols and aromatic polybasic acids such as trimellitic anhydride and pyromellitic anhydride can be used in combination therewith. However, since introduction of these aromatic components impairs biodegradability, the amount of aromatic glycols and aromatic polybasic acids to be incorporated should be not higher than 20 parts by weight, preferably not higher than 10 parts by weight, and more preferably not higher than 5 parts by weight based on 100 parts by weight of aliphatic glycols.

Further, catalysts for manufacturing the above-described aliphatic glycol/polybasic acid type polyesters include, for example, organic acid salts, alkoxides or oxides of metals such as titanium, tin, antimony, cerium, zinc, cobalt, iron, lead, manganese, aluminum, magnesium and germanium. Among them, tin-based or aluminum-based compounds are preferable.

Manufacturing of the above-described aliphatic glycol/polybasic acid type polyesters can be performed by reacting equivalent amounts of aliphatic glycols and aliphatic polybasic acids together with a catalyst, by heating in a solvent, if necessary, suitably selected for each raw material compound. A prepolymer having a low degree of polymerization can be manufactured by suppressing progress of the reaction.

In manufacturing the above-described aliphatic glycol/polybasic acid type polyesters, a coupling agent can be used for a prepolymer having a particularly low degree of polymerization to further increase number average molecular weight. This coupling agent includes, for example, diisocyanates, oxazoline, diepoxy compounds and acid anhydrides, and use of diisocyanates is particularly preferable.

Diisocyanates as the above-described coupling agent is not specifically limited in type thereof, and include, for example, 2,4-tolylene diisocyanate, a mixture of 2,4-tolylene diisocyanate and 2,6-tolylene diisocyanate, diphenylmethane diisocyanate, 1,5-naphthalene diisocyanate, xylylene diidocyanate, hydrogenated xylylene diidocyanate, hexamethylene diisocyanate, isophorone diisocyanate and 4,4'-dicyclohexylmethane diisocyanate. Among them, hexamethylene diisocyanate is particularly preferable from the viewpoints of hue of aliphatic glycol/polybasic acid type polyesters obtained and reactivity when compounded into the above-described prepolymer.

Amount of the above-described coupling agent to be used is 0.1 to 5 parts by weight, preferably 0.5 to 3 parts by weight to 100 parts by weight of the above-described prepolymer. An amount less than 0.1 parts by weight can not provide sufficient coupling reaction, and an amount over 5 parts by weight may cause gelation.

Further, the above-described aliphatic glycol/polybasic acid type polyesters may be capped or modified at a terminal hydroxyl group thereof with other compounds via double bond, urethane linkage and urea linkage, or by other methods.

Aliphatic polyesters, which are condensed products of polyvalent alcohols and polybasic acids, practically available on the market include, for example, polybutylene succinate (PBS) and polyethylene succinate (PES).

Polybutylene succinate (PBS) type aliphatic polyesters include, for example, polybutylene succinate (PBS) consisting of butanediol and succinic acid, or adipate copolymer (PBSA) in which adipic acid is copolymerized therein, and further an adipate/terephthalate copolymer in which terephthalic acid is copolymerized therein, to facilitate biodegradability. Commercially available products include, for example, "Bionolle" (trade name) from Showa Highpolymer Co., Ltd., "EnPol" (trade name) from Elle Chemical Ltd., "Ecoflex" (trade name) from BASF A.G. and "Biomax" (trade name) from Du Pont Co.

Further, polyethylene succinate (PES) has also been available on the market, and commercial products thereof include, for example, "Ruare SE" (trade name) from Nippon Shokubai Co., Ltd.

(3) Aliphatic Polyesters Produced by Microorganisms

Certain kinds of microorganisms accumulate polyester materials in their cells. Polyester materials produced by microorganisms are thermoplastic polymers having organism-derived melting point. And such polymers are decomposed by an enzyme, extracellularly secreted from the microorganisms in nature, and the decomposed products are consumed by microorganisms until complete extinction.

Such (aliphatic) polyesters produced by microorganisms include polyhydroxybutyrate (PHB), and copolymers such as poly(hydroxyvaleric acid-hydroxylpropionic acid) and poly(hydroxylbutyric acid-hydroxylpropionic acid).

(4) Polycaprolactone Type Aliphatic Polyesters

Polycaprolactone, which is a kind of an aliphatic polyester, can be obtained by ring opening polymerization of ε-caprolactone, and decomposed by various bacteria in spite of a water-insoluble polymer.

Polycaprolactone is an aliphatic polyester represented by the general formula: —$(O(CH_2)_5CO)_n$—, and a commercial product of such a polyeaprolactone type aliphatic polyester includes, for example, "Tone" (trade name) from Nippon Unicar Co., Ltd.

A stabilizer against hydrolysis of the present invention is used in an effective amount to obtain improvements in stability against hydrolysis and resistance to yellowing of an ester-group-containing resin or a biodegradable plastic, that is an easily hydrolysable resin.

A carbodiimide compound shows yellowing progressed by heat, thermal oxidation and the like, not only in a synthesis step thereof but also in a compounding step into an ester-group-containing resin or a biodegradable plastic.

Further, since yellowing of a carbodiimide compound is caused by heat, $NO_x$, sunlight, etc. molded resin parts themselves exhibit yellowing even after molding. Yellowing becomes more significant with increase in the amount of a carbodiimide compound to be compounded into a resin.

Thus, the amount of a carbodiimide composition of the present invention, to be compounded, is preferably 0.01 to 5 parts by weight, and particularly preferably 0.1 to 3 parts by weight to 100 parts by weight of an easily hydrolysable resin, as described above.

In the present invention, mixing of the above-described stabilizer against hydrolysis into an ester-group-containing resin or a biodegradable plastic, that is, an easily hydrolysable resin, can be performed by dissolving a carbodiimide composition in an organic solvent, followed by removing said organic solvent. In this case, said organic solvent to be used is desirably capable of dissolving a biodegradable plastic, and furthermore not polymerizable and has no active hydrogen. Typically, said solvents include, for example, chloroform and tetrahydrofuran (THF).

Further, a mixing method for the above-described stabilizer against hydrolysis into an ester-group-containing resin or a biodegradable plastic, that is, an easily hydrolysable resin, includes melt kneading using an extruder or a method to add a stabilizer against hydrolysis after synthesis of an ester-group-containing resin or a biodegradable plastic.

In the case of said melt kneading method using an extruder, any of the following method may be used.

(i) A stabilizer against hydrolysis and an ester-group-containing resin or a biodegradable plastic is mixed simultaneously.

(ii) An ester-group-containing resin or a biodegradable plastic is dissolved first, then a stabilizer against hydrolysis is mixed using a side feeder or a liquid addition equipment.

3. Other Additives

An ester-group-containing resin or a biodegradable plastic composition of the present invention, that is, a thermoplastic composition, may contain, in addition to a stabilizer against hydrolysis of the present invention, reinforcing materials other than the above-described stabilizer against hydrolysis, such as clay, phyllosilicate salt, talc, mica, inorganic or organic fillers, kenaf and pulp, within a range not to impair the effects of the present invention, if necessary.

Also it may contains antioxidants of amine type or phenol type, thermal stabilizers, hindered amine type light stabilizers, UV absorbing agents, as well as flame retardants, lubricants, waxes, pigments, dyes, colorants, crystallization accelerators, titanium oxide, organic degradable materials such as starch or the like in combination, within a range not to impair the effects of the present invention.

EXAMPLES AND COMPARATIVE EXAMPLES

Hereinbelow, the present invention will be described in more detail. Here, physical properties in Examples were measured and evaluated by the following methods.

[Yellow Index (YI)]

Yellow. Index ($YI_0$) was measured under the conditions in accordance with JIS K7103. As a color difference colorimeter, NF 333 from Nippon Denshoku Kogyo Co., Ltd. was used.

[Thermal Discoloration]

YI was measured after standing in a dryer at 120° C. for 75 hours, and thermal discoloration was calculated by the following equation (1):

$$\Delta YI = YI - YI_0 \quad \text{Equation (1):}$$

[Sunlight Discoloration]

Using test sample pieces, YI was measured after irradiation by a xenon lamp for 500 hours under the conditions of BPT at 60° C.×50% R.H., and sunlight discoloration was calculated by the following equation (2):

$$\Delta YI = YI - YI_0 \quad \text{Equation (2):}$$

[Stability Against Hydrolysis]

(1) Polyethylene terephthalate: Using test pieces of a sample provided, tensile strength was measured after dipping at 120° C. for 120 hours by a pressure cooker test, and stability against hydrolysis was calculated as percentage (%) to tensile strength before standing. Higher retention of tensile strength is judged to be higher stability against hydrolysis.

(2) Polylactic acid: Using test sample pieces, tensile strength was measured after standing in a thermo-hygrostat at 80° C., 90% R.H. for a specified period (100 hours), and stability against hydrolysis was calculated as percentage (%) to tensile strength before standing. Higher tensile strength retention means higher stability against hydrolysis.

[Heat resistance] [5% Weight Loss Temperature TG 5% (° C.)]

Heat resistance was measured on about 10 mg of sample using TG/DTA instrument, model TG/DTA 6200 from Seiko Instruments Inc., under nitrogen atmosphere at temperature increasing rate of 10° C./min. Heat resistance was measured as "temperature" at which sample weight loss is 5% based on the initial weight.

Before carrying out Examples and Comparative Examples, carbodiimide compounds and carbodiimide compositions were synthesized.

Synthesis Example 1

Synthesis of a Carbodiimide Compound

Into a flask equipped with a stirring motor, a nitrogen gas bubbling tube and a condenser, 100 parts by weight of 4,4'-dicyclohexylmethane diisocyanate, 0.5 part by weight of 3-methyl-1-phenyl-2-pholene-1-oxide and 1 part by weight of bis(2,4-di-tert-butylphenyl)pentaerythritol-diphosphite and 1 part by weight of pentaerythritol-tetrakis [3-(3,5-di-tert-butyl-4-hydroxyphenyl)propionate], both as antioxidants, were charged. The mixture was subjected to a carbodiimidation reaction at 185° C. for 24 hours, with nitrogen gas bubbling. NCO % of carbodiimide obtained was 2.4%.

Synthesis Example 2

Synthesis of a Carbodiimide Compound

Into a flask equipped with a stirring motor, a nitrogen gas bubbling tube and a condenser, 100 parts by weight of 4,4'-dicyclohexylmethane diisocyanate and 0.5 part by weight of 3-methyl-1-phenyl-2-phosphorene-1-oxide were charged. The mixture was subjected to a carbodiimidation reaction at 185° C. for 24 hours with nitrogen gas bubbling. NCO % of carbodiimide obtained was 2.4%.

Synthesis Example 3

Synthesis of a Carbodiimide Composition

Into a flask equipped with a stirring motor, a nitrogen gas bubbling tube and a condenser, 100 parts by weight of 4,4'-dicyclohexylmethane diisocyanate, 0.5 part by weight of 3-methyl-1-phenyl-2-phospholene-1-oxide and, as an antioxidant, 0.5 part by weight of bis(2,4-di-tert-butylphenyl)pentaerythritol diphosphite were charged. The mixture was subjected to a carbodiimidation reaction at 185° C. for 24 hours with nitrogen gas bubbling. NCO % of carbodiimide obtained was 2.4%.

Examples 1 to 3

In Examples 1 to 3, polyethylene terephthalate, an aromatic polyester, was used as an easily hydrolysable resin (an ester-group-containing resin). Mixtures of 100 parts by weight of polyethylene terephthalate, 1.0 part by weight of the carbodiimide composition synthesized in Synthesis Example 1 for Examples 1 and 2 or the carbodiimide composition synthesized in Synthesis Example 2 for Example 3 and 0.05 part by weight of bis-(2,4-di-t-butylphenyl)pentaerythritol diphosphite, as a phosphorus antioxidant, for Examples 1 and 3, were dry blended, respectively, then kneaded by a twin-screw extruder to prepare films with thickness of 200 μm through a T-die. Dumb-bells according to JIS No. 4 were punched from these films as test pieces to be subjected for measurements of physical properties. The compositions and the evaluation results are shown in Table 1.

Comparative Example 1

In Comparative Example 1, the same procedure was repeated as in Example 1 except that the carbodiimide composition was altered to Stabakzol P (from Bayer A.G.), which is a carbodiimide compound on the market, to prepare a film, which was used for evaluation of physical properties. The composition and the evaluation results are shown in Table 1.

TABLE 1

|  | Example 1 | Example 2 | Example 3 | Comparative Example 1 |
|---|---|---|---|---|
| 1. Composition (parts by weight) | | | | |
| (1) Easily hydrolysable resin (C) | | | | |
| Polyethylene terephthalate | 100 | 100 | 100 | 100 |
| Polylactic acid (aliphatic polyester) | — | — | — | — |
| (2) Stabilizer against hydrolysis | | | | |
| (A) Carbodiimide composition (compound) | | | | |
| Synthesis Example 1 [Carbodiimide compound (a) + Antioxidant (b)] | 1.0 | 1.0 | — | — |
| Synthesis Example 2 [Carbodiimide compound (a)] | — | — | 1.0 | — |
| Synthesis Example 3 [Carbodiimide compound (a) + Antioxidant (b)] | — | — | — | — |
| Stabakzol P | — | — | — | 1.0 |
| (B) Phosphorous antioxidant (Phosphite type) | | | | |
| Bis(2,4-di-t-butylphenyl)pentaerythritol diphosphite | 0.05 | — | 0.05 | 0.05 |
| Tris-(2,4-di-t-butylphenyl)phosphite | — | — | — | — |
| 2. Evaluation results | | | | |
| Yellow Index (YI) of carbodiimide composition (compound) | 5.7 | 5.7 | 10.2 | 30.7 |
| Stability against hydrolysis, Retention of strength (%) | 95.3 | 90.7 | 90.2 | 64.5 |
| $YI_0$ | 0.8 | 1.0 | 1.7 | 5.1 |
| Thermal discoloration, Coloring after 75 hours ($\Delta YI$) | 0.7 | 0.9 | 1.5 | 2.1 |
| Sunlight discoloration, Coloring after 500 hours ($\Delta YI$) | 1.4 | 1.4 | 1.9 | 9.3 |

Examples 4 to 7

In Examples 4 to 7, an aliphatic polyester containing a polylactic acid as a main component was used as an easily hydrolysable resin (a biodegradable plastic). Mixtures of 100 parts by weight of an aliphatic polyester and 1.0 part by weight of the carbodiimide composition synthesized in Synthesis Example 1, as common components for Examples 4 to 7, and additionally each 0.1 part by weight of bis-(2,4-di-t-butylphenyl)pentaerythritol-diphosphite as a phosphorus antioxidant, tris-(2,4-di-t-butylphenyl)phosphite as a phosphorus antioxidant and pentaerythritol-tetrakis[3-(3,5-di-t-butyl-4-hydroxyphenyl)propionate] as a hindered phenol antioxidant for Example 4, 5 and 6, respectively, were dry blended, followed by kneading using a twin-screw extruder to prepare films with a thickness of 200 μm through a T-die. Dumb-bells according to JIS No. 4 were punched from these films as test pieces, and used for measurements of physical properties. The compositions and the evaluation results are shown in Table 2.

Examples 8 and 9

In Examples 8 and 9, an aliphatic polyester containing a polylactic acid as a main component was used as an easily hydrolysable resin (a biodegradable plastic). Mixtures of 100 parts by weight of an aliphatic polyester, 1.0 part by weight of the carbodiimide composition synthesized in Synthesis Example 2 for Example 8, or 1.0 part by weight of the carbodiimide composition synthesized in Synthesis Example 3 and 0.1 part by weight of bis-(2,4-di-t-butylphenyl)pentaerythritol-diphosphite as a phosphorus antioxidant for Example 9, were dry blended, then kneaded by a twin-screw extruder to prepare films with a thickness of 200 μm through a T-die. Dumb-bells according to JIS No. 4 were punched from these films as test pieces, and used for measurements of physical properties. The compositions and the evaluation results are shown in Table 2.

Comparative Examples 2 and 3

In Comparative Example 2, the same procedure was repeated as in Example 8 except that a phosphorus antioxidant was not compounded to prepare a film, which was used for evaluation of physical properties. The composition and the evaluation results are shown in Table 2.

In Comparative Example 3, the same procedure was repeated as in Example 4 except that the carbodiimide composition was Stabakzol P (from Bayer A.G.), which is a carbodiimide compound on the market, to prepare a film, which was used for evaluation of physical properties. The composition and the evaluation results are shown in Table 2.

TABLE 2

|  | Example 4 | Example 5 | Example 6 | Example 7 | Example 8 | Example 9 | Comparative Example 2 | Comparative Example 3 |
|---|---|---|---|---|---|---|---|---|
| 1. Composition (parts by weight) | | | | | | | | |
| (1) Easily hydrolysable resin (C) | | | | | | | | |
| Polyethylene terephthalate | — | — | — | — | — | — | — | — |
| Polylactic acid (aliphatic polyester) | 100 | 100 | 100 | 100 | 100 | 100 | 100 | 100 |

TABLE 2-continued

|  | Example 4 | Example 5 | Example 6 | Example 7 | Example 8 | Example 9 | Comparative Example 2 | Comparative Example 3 |
|---|---|---|---|---|---|---|---|---|
| (2) Stabilizer against hydrolysis | | | | | | | | |
| (A) Carbodiimide composition (compound) | | | | | | | | |
| Synthesis Example 1 [Carbodiimide compound (a) + Antioxidant (b)] | 1.0 | 1.0 | 1.0 | 1.0 | — | — | — | — |
| Synthesis Example 2 [Carbodiimide compound (a)] | — | — | — | — | 1.0 | — | 1.0 | — |
| Synthesis Example 3 [Carbodiimide compound (a) + Antioxidant (b)] | — | — | — | — | — | 1.0 | — | — |
| Stabakzol P | — | — | — | — | — | — | — | 1.0 |
| (B) Phosphorous antioxidant (Phosphite type) | | | | | | | | |
| Bis(2,4-di-t-butylphenyl)pentaerythritol diphosphite | 0.1 | — | — | — | 0.1 | 0.1 | — | 0.1 |
| Tris(2,4-di-t-butylphenyl)phosphite | — | 0.1 | — | — | — | — | — | — |
| (C) Hindered phenol type of antioxidant | | | | | | | | |
| Pentaerythritol-tetrakis[3-(3,5-di-t-butyl-4-hydroxyphenyl)propionate] | — | — | 0.1 | — | — | — | — | — |
| 2. Evaluation results | | | | | | | | |
| Yellow Index (YI) of carbodiimide composition (compound) | 5.7 | 5.7 | 5.7 | 5.7 | 10.2 | 7.1 | 10.2 | 30.7 |
| Stability against hydrolysis, Retention of strength (%) | 91.0 | 85.0 | 89.5 | 81.7 | 84.0 | 85.2 | 78.0 | 68.0 |
| $YI_0$ | 4.1 | 4.4 | 4.3 | 4.5 | 5.2 | 4.9 | 5.7 | 6.9 |
| Thermal discoloration, Coloring after 75 hours ($\Delta YI$) | 0.3 | 0.7 | 0.3 | 0.8 | 1.3 | 1.0 | 3.7 | 2.1 |
| Sunlight discoloration, Coloring after 500 hours ($\Delta YI$) | 0.9 | 1.2 | 1.1 | 1.2 | 1.6 | 1.4 | 1.8 | 21.0 |

As obvious from the results of Examples and Comparative Examples shown in Tables 1 and 2, in Examples 1 to 9 where a stabilizer against hydrolysis of the present invention, comprising an aliphatic carbodiimide composition or a carbodiimide compound and a phosphorus antioxidant, was compounded into an easily biodegradable resin in a specified amount, stability against hydrolysis, that is, resistance to biodegradation caused by hydrolysis, and discoloration were found to be remarkably improved compared with the compositions in Comparative Examples 1 and 3 where, for example, a commercially available aromatic carbodiimide compound and a phosphorus antioxidant were compounded, or the composition in Comparative Example 2 where a synthesized carbodiimide compound was compounded.

INDUSTRIAL APPLICABILITY

A thermoplastic resin composition, where a stabilizer against hydrolysis of the present invention is compounded in at least one kind of an easily hydrolysable resin selected from a group consisting of an ester-group-containing resin and a biodegradable plastic in a specified amount, is superior in stability against hydrolysis and has an enhanced effect to prevent yellowing, therefore the composition can be applied to agricultural, forestal and fisheries materials (mulch film, mulch sheet, planting pot, fishing line, fishing net, and the like), civil engineering materials (water holding sheet, plant net, sandbag, and the like), molded parts, extruded articles, thermoformed articles, foamed bodies, blow molded articles, fibers, nonwoven fabrics and films for packaging/containers, and is particularly suitably to films, sheets, fibers for clothing, bottles and trays where hue is seriously considered.

What is claimed is:

1. A stabilizer against hydrolysis comprising a carbodiimide composition comprising an aliphatic carbodiimide compound (A) and a phosphorus-containing antioxidant (B),
    wherein the phosphorus-containing antioxidant (B) comprises phosphorus-containing antioxidant ($B^1$) dispersed and present in the carbodiimide composition by admixing the phosphorus-containing antioxidant ($B^1$) during synthesis of the aliphatic carbodiimide compound (A).

2. A stabilizer against hydrolysis comprising a carbodiimide composition comprising an aliphatic carbodiimide compound (A) and a phosphorus-containing antioxidant (B),
    wherein the phosphorus-containing antioxidant ($B^1$) is admixed in a raw material of the aliphatic carbodiimide compound (A) prior to synthesis of the aliphatic carbodiimide compound (A).

3. The stabilizer against hydrolysis according to claim 1, wherein 0.01 to 20 parts by weight of a total amount of antioxidant in the stabilizer is compounded to 100 parts by weight of the aliphatic carbodiimide compound (A).

4. The stabilizer against hydrolysis according to claim 1, wherein the phosphorus-containing antioxidant (B) comprises phosphorus-containing antioxidant ($B^2$) further compounded in the carbodiimide composition, and an amount of 0.01 to 20 parts by weight of a total amount of antioxidant in the stabilizer is compounded to 100 parts by weight of the aliphatic carbodiimide compound (A).

5. The stabilizer against hydrolysis according to claim 1, wherein the carbodiimide composition has a yellow index (YI) of not higher than 20.

6. The stabilizer against hydrolysis according to claim 1, wherein the aliphatic carbodiimide compound (A) is an aliphatic polycarbodiimide compound having degree of polymerization of not lower than 5.

7. The stabilizer against hydrolysis according to claim 1, wherein the carbodiimide composition further contains a hindered phenol containing antioxidant in addition to the phosphorus-containing antioxidant (B).

8. The stabilizer against hydrolysis according to claim 1, wherein the phosphorus-containing antioxidant (B) has pentaerythritol structure.

9. A thermoplastic resin composition having superior stability against hydrolysis, wherein the stabilizer against hydrolysis comprising a carbodiimide composition comprising an aliphatic carbodiimide compound (A) and a phosphorus-containing antioxidant (B) is compounded in at least one kind of an easily hydrolysable resin (C) selected from a group consisting of an ester-group-containing resin and a biodegradable plastic.

10. The thermoplastic resin composition according to claim 9, wherein the stabilizer against hydrolysis is compounded in an amount of 0.01 to 5 parts by weight to 100 parts by weight of the easily hydrolysable resin (C).

11. The thermoplastic resin composition according to claim 9, wherein the easily hydrolysable resin (C) is an aliphatic polyester.

12. A plastic molded part made from the thermoplastic resin composition according to any one of claims 9 to 11.

13. The plastic molded part according to claim 12, wherein the plastic molded part is a molded article, extruded article, blow molded article, fiber, nonwoven fabric, film or sheet article.

14. The stabilizer against hydrolysis according to claim 2, wherein 0.01 to 20 parts by weight of a total amount of antioxidant in the stabilizer is compounded to 100 parts by weight of the aliphatic carbodiimide compound (A).

15. The stabilizer against hydrolysis according to claim 2, wherein the phosphorus-containing antioxidant (B) comprises phosphorus-containing antioxidant ($B^2$) further compounded in the carbodiimide composition, and an amount of 0.01 to 20 parts by weight of a total amount of antioxidant in the stabilizer is compounded to 100 parts by weight of the aliphatic carbodiimide compound (A).

16. The stabilizer against hydrolysis according to claim 2, wherein the carbodiimide composition has a yellow index (YI) of not higher than 20.

17. The stabilizer against hydrolysis according to claim 2, wherein the aliphatic carbodiimide compound (A) is an aliphatic polycarbodiimide compound having degree of polymerization of not lower than 5.

18. The stabilizer against hydrolysis according to claim 2, wherein the carbodiimide composition further contains a hindered phenol containing antioxidant in addition to the phosphorus-containing antioxidant (B).

19. The stabilizer against hydrolysis according to claim 2, wherein the phosphorus-containing antioxidant (B) has pentaerythritol structure.

* * * * *